U S 0 0 6 4 3 8 2 9 9 B 1

US006438299B1

(12) United States Patent
Brown et al.

(10) Patent No.: US 6,438,299 B1
(45) Date of Patent: Aug. 20, 2002

(54) ASSEMBLY AND METHOD FOR FURCATING OPTICAL FIBERS

(75) Inventors: Gair D. Brown, King George; Robert A. Throm; Yancy T. Jeleniewski, both of Fredericksburg, all of VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/311,900

(22) Filed: May 14, 1999

Related U.S. Application Data

(63) Continuation-in-part of application No. 08/944,105, filed on Sep. 30, 1997, now Pat. No. 5,903,693.

(51) Int. Cl.[7] .................................................. G02B 6/44
(52) U.S. Cl. ..................... 385/100; 385/106; 385/109; 385/112; 385/113
(58) Field of Search ................................ 385/109, 113, 385/110, 86, 106, 112, 100

(56) References Cited

U.S. PATENT DOCUMENTS

| 5,201,019 A | 4/1993 | Gallusser et al. ............. 385/99 |
| 5,231,688 A | 7/1993 | Zimmer ....................... 385/139 |
| 5,259,050 A | 11/1993 | Yamakawa et al. ........... 385/59 |
| 5,297,227 A | 3/1994 | Brown et al. ................. 385/56 |
| 5,473,718 A | 12/1995 | Sommer ....................... 385/87 |
| 5,970,195 A | * 10/1999 | Brown ......................... 385/100 |

* cited by examiner

Primary Examiner—Frank G. Font
Assistant Examiner—Michael P. Mooney
(74) Attorney, Agent, or Firm—James B. Bechtel, Esq.; Raymond H. J. Powell, Jr., Esq.

(57) ABSTRACT

An assembly that includes a fiber-containing structure that contains a plurality of optical fibers and a furcation tube assembly that includes a plurality of loose tube optical fiber cables. Each of the loose tube optical fiber cables includes a hollow inner tube; a support structure that includes strength members, the support structure surrounding the hollow inner tube; and, a protective jacket surrounding the support structure. The assembly further includes a heat shrink tube that joins the fiber-containing structure and the furcation tube assembly and a protective tube surrounded by the heat shrink tube and disposed in surrounding relationship to the furcation tube assembly. The support structure extends in a first direction between an outer surface of the fiber-containing structure and an inner surface of the protective tube proximate a first end of the protective tube.

30 Claims, 3 Drawing Sheets

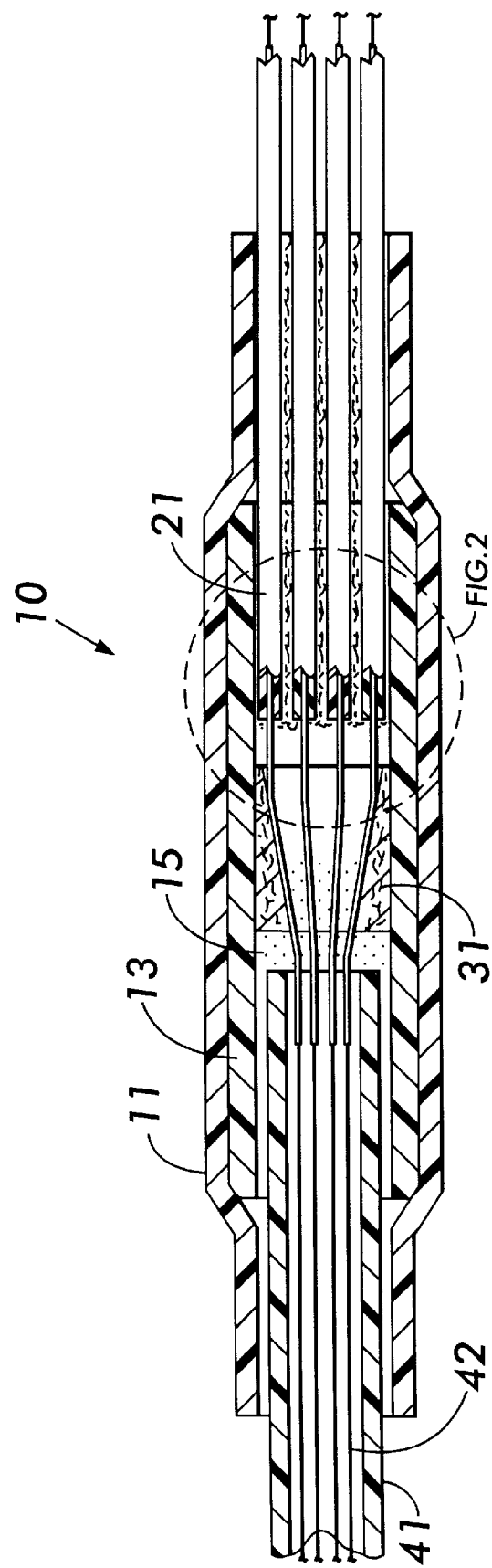

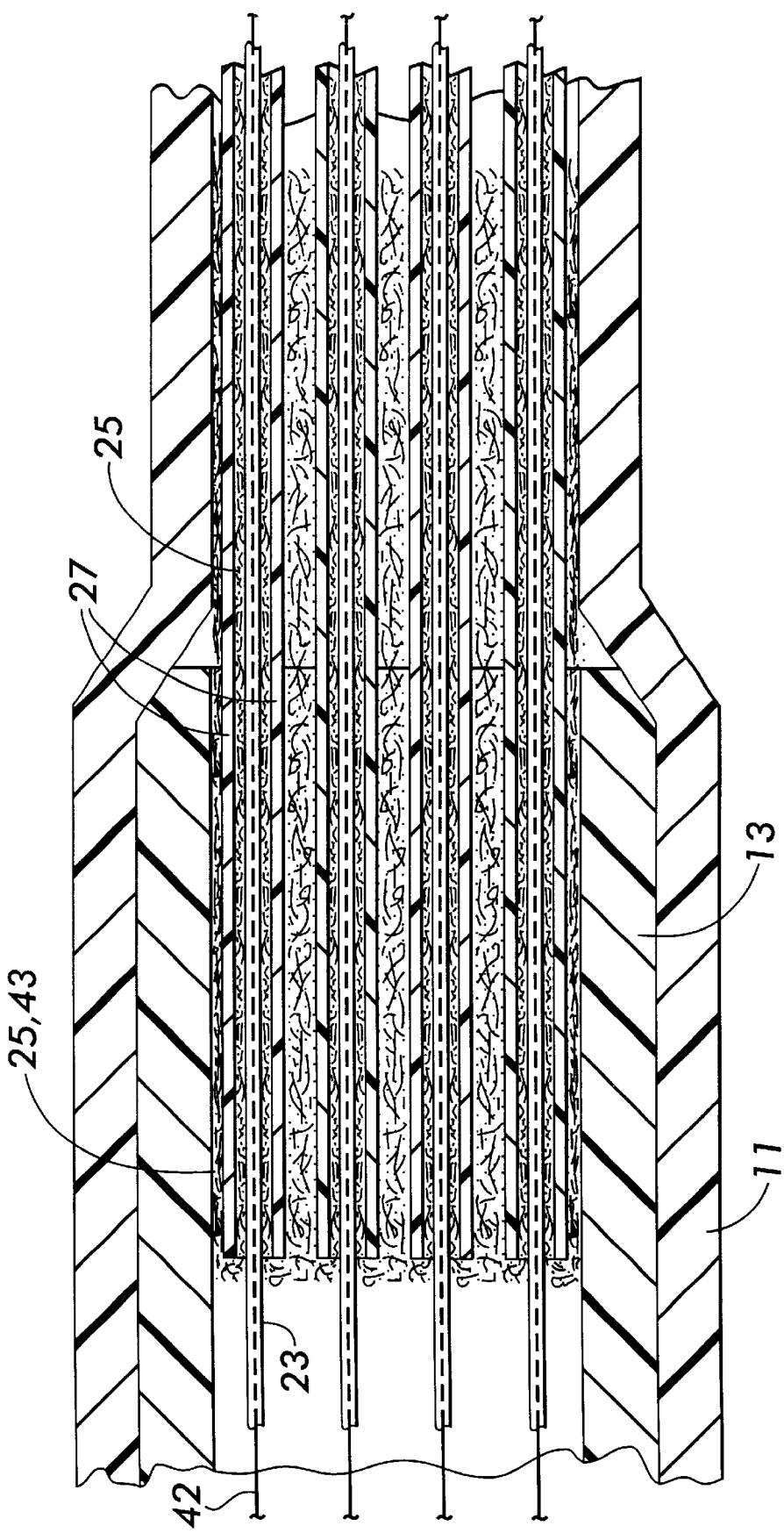

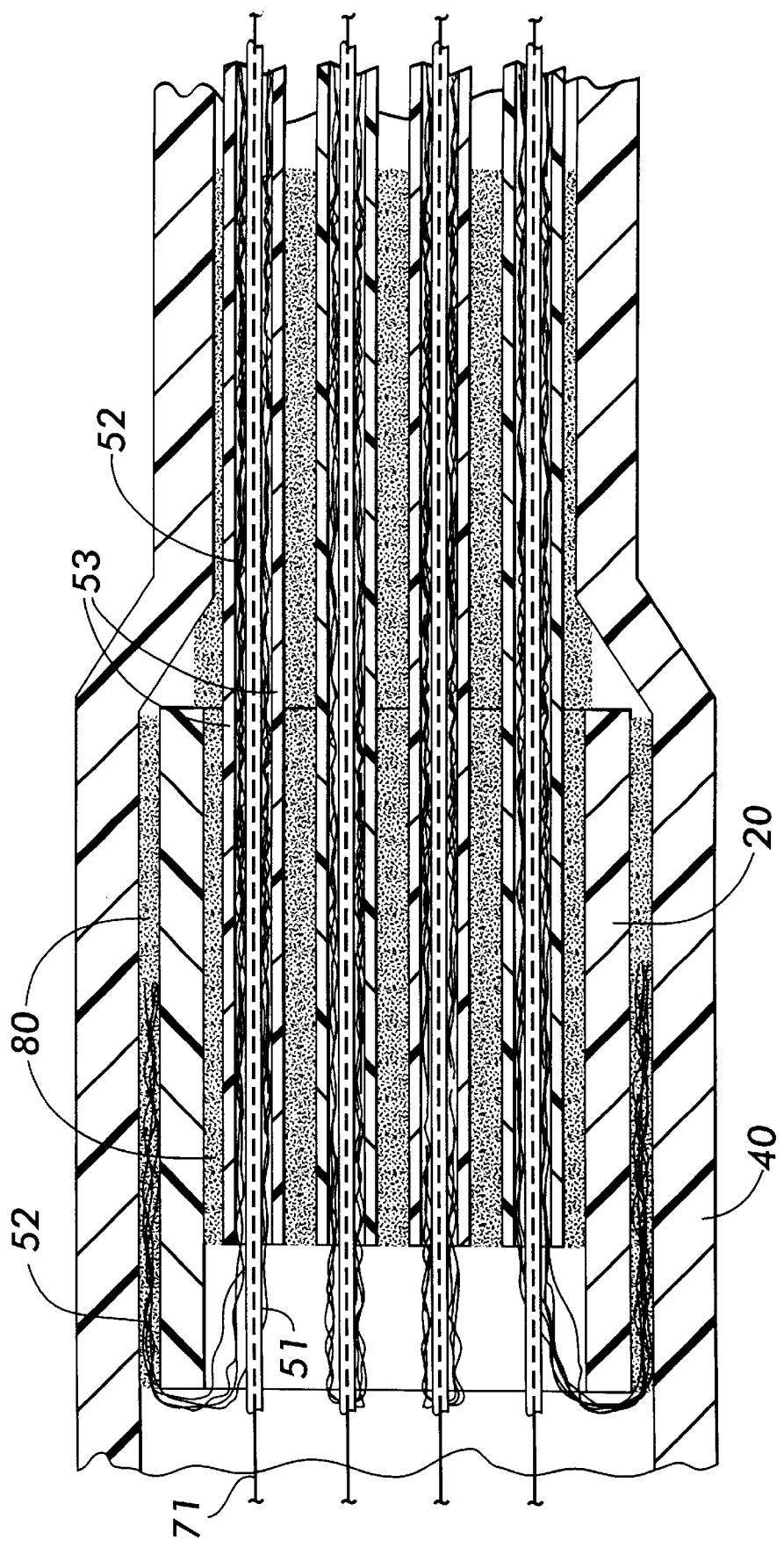

ASSEMBLY AND METHOD FOR FURCATING OPTICAL FIBERS

CROSS-REFERENCE TO RELATED APPLICATION

The present application is a continuation-in-part of parent application Ser. No. 08/944,105, now U.S. Pat. No. 5,903,693 entitled "Fiber Optic Cable Furcation Unit", filed Sep. 30, 1997, the disclosure of which is fully incorporated herein by reference, with priority of the filing date thereof hereby claimed for all subject matter disclosed therein.

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The present invention relates generally to optical fiber connectors and, more particularly, to an assembly and method for furcating optical fibers that constitutes an alternative embodiment of the invention disclosed in the previously-referenced parent application.

BACKGROUND OF THE INVENTION

In recent years, electro-optical equipment has begun to replace electronic equipment for certain applications, such as telecommunication and data communication networks. This trend should continue because the electro-optical equipment has inherent advantages over purely electronic equipment. These advantages include a broader bandwidth for signal transmission, greater storage capability for data, and inherent immunity to electromagnetic interference. Given these advantages of electro-optical equipment, fiber optic cables have become increasingly important because they transmit information and signals between the various pieces of electro-optical equipment.

The appearance of these cables resemble electrical cables, but fiber optic cables are smaller in size and lighter in weight. Fiber optic cables comprise optical fibers and other cable elements which are protected from the external environment by an external jacketing. These cables may be of a traditional design with the fibers surrounded by strength members and protective elements in the cable core or of a more non-traditional, loosely-bundled type with the fibers contained loosely within tubes or ducts in a cable core.

Whether traditional or loosely-bundled, all types of optical fiber cables may contain groups of optical fibers with no individual protective jacketing or strength members. These fibers are typically 250 micrometers or 500 micrometers in diameter. At the ends of the fiber optic cables, the small unprotected fibers must be removed from the outer protective cable structure and inserted into fiber optic connection devices (connectors or splices). Due to the small size of the fibers and the lack of protective coverings over the individual fibers, connectorization and splicing is difficult. Special protective equipment must be used to organize the loose fibers and to protect the completed connections. In order to make the installation of fiber cables reliable and efficient, there exists a need in the art for a furcation unit which allows individual optical fibers to be easily handled, connectorized, and spliced. Further, in order to prevent degradation of the prepared fibers, the furcation unit must protect the fiber ends from moisture, dust, and other contaminants.

The fiber optic furcation unit disclosed in the previously-referenced parent application Ser. No. 08/944,105 fulfills this need in the art, thereby allowing for fast, efficient installation by field technicians. The present invention constitutes an alternative embodiment of the invention disclosed in the above-referenced parent application.

SUMMARY OF THE INVENTION

The present invention encompasses an assembly that includes a fiber-containing structure that contains a plurality of optical fibers and a furcation tube assembly that includes a plurality of loose tube optical fiber cables. Each of the loose tube optical fiber cables includes a hollow inner tube; a support structure that includes strength members, the support structure surrounding the hollow inner tube; and, a protective jacket surrounding the support structure. The assembly further includes a heat shrink tube that joins the fiber-containing structure and the furcation tube assembly and a protective tube surrounded by the heat shrink tube and disposed in surrounding relationship to the furcation tube assembly. The support structure extends in a first direction between an outer surface of the fiber-containing structure and an inner surface of the protective tube proximate a first end of the protective tube. In one embodiment, the support structure is folded back and further extends in a second direction opposite to the first direction between an outer surface of the protective tube and an inner surface of the heat shrink tube. In another embodiment, the support structure extends in the second direction to a prescribed termination point that is located intermediate opposite ends of the protective tube. In another embodiment, the support structure extends in the second direction to a prescribed termination point that is located proximate a second end of the protective tube that is opposite the first end of the protective tube. In yet another embodiment, the support structure extends in the second direction to a prescribed termination point that is located beyond a second end of the protective tube that is opposite the first end of the protective tube. The protective tube is preferably made of a rigid material that provides structural support to withstand bending and tensile loads, and the heat shrink tube is preferably an adhesive-coated heat shrink tube.

In another of its aspects, the present invention encompasses a method that includes the steps of providing a fiber-containing structure that contains a plurality of optical fibers; providing a furcation tube assembly that includes a plurality of loose tube optical fiber cables; joining the fiber-containing structure and the furcation tube assembly with a heat shrink tube; coupling the plurality of optical fibers to respective ones of the plurality of loose tube optical fiber cables; and, assembling a protective tube in surrounding relationship to the furcation tube assembly and inside of the heat shrink tube in substantially concentric relationship thereto. The step of providing a furcation tube assembly that includes a plurality of loose tube optical fiber cables includes the sub-steps of providing a plurality of hollow inner tubes; constructing a support structure in surrounding relationship to the plurality of hollow inner tubes; extending the support structure in a first direction between an outer surface of the fiber-containing structure and an inner surface of the protective tube proximate a first end of the protective tube; and, assembling a protective jacket in surrounding relationship to the support structure. The method preferably further includes the step of connectorizing the plurality of loose tube optical fiber cables to a fiber optic splice or a fiber optic connector.

BRIEF DESCRIPTION OF THE DRAWINGS

The foregoing objects and other advantages of the present invention will be more fully understood from the following detailed description and reference to the appended drawings wherein:

FIG. 1 is a cross-sectional view of the fiber optic cable furcation unit disclosed in the previously-referenced parent application (Ser. No. 08/944,105);

FIG. 2 is an expanded cross-sectional view of the portion of the fiber optic cable furcation unit depicted in FIG. 1, that contains the ends of the loose tube single fiber optical cables; and, FIG. 3 is an expanded cross-sectional view of an alternative embodiment of the fiber optic cable furcation unit disclosed in the previously-referenced parent application, in accordance with the present invention.

DETAILED DESCRIPTION OF THE INVENTION

Referring now to FIG. 1, a fiber optical cable furcation-unit 10 for furcating fiber optic cables is shown. The furcation unit 10 comprises an adhesive coated heat shrink tubing 11, enclosing a protective tube 13 and a sealant material 15. The furcation unit 10 further comprises a plurality of loose tube single fiber optical cables 21 and a spacer/fiber guide 31. The furcation unit 10 fits onto the end of a fiber optic cable 41 allowing the optical fibers 42 to pass through the spacer/fiber guide 31 and protective tube 13 into the loose tube single fiber optical cables 21. The adhesive coated heat shrink tubing 11 securely holds the furcation unit 10 onto the optical fiber cable 41 and firmly holds the protective tube 13 and the multiple loose tube single fiber optical cables 21 in position. In the preferred embodiment, the heat shrink tubing is a polyolefin tube and the protective tube is a polyethylene plastic tube. The furcation unit 10, when constructed in this manner, is extremely rugged and can withstand bending, dropping, tensile loads and other rigors. The sealant material 15 fills any voids in the end of the fiber optic cable 41, and further fills any voids between the fiber optic cable 41 and the protective tube 13. A variety of sealant materials may be used including silicone sealants or other similar material. The sealant material 15 also fills a short length within the interior of the protective tube 13, thereby completing the sealing of the furcation unit 10 to the fiber optic cable 41. The spacer/fiber guide 31 loosely fits within the protective tube 13 and may be held in place by the sealant material 15. Depending on the type of fiber optic cable, the spacer/fiber 20 guide 31 may not be required.

Referring now to FIG. 2, the loose tube single fiber cables each comprise an inner tube 23, strength members 25, and an outer protective jacketing 27. The loose tubes can be fabricated using nylon tubes and the strength members may be fabricated using an arimid fiber material. In the preferred embodiment, Kevlar™ fiber is used for the strength members. The inner tube 23 is dimensioned so that the optical fibers 42 can easily be passed through a length of the tube and so that the inner tube 23 can be inserted into the rear of common fiber optic connectors and splices. The strength members 25 are used within the loose tube single fiber cables 21 to allow proper termination of the optical fiber 42 into fiber optic connectors and splices which are designed to attach to a single fiber cable strength member. In the embodiment depicted in FIGS. 1 and 2, the strength members 25 protrude from the interior end of the loose tube single fiber cables 21 and are folded back along the is; exterior of the loose tube single fiber cables and are captured in the adhesive matrix 43, (in this case a two-part epoxy adhesive). Captured in this manner, the loose tube single fiber cable 21 cannot be accidentally pulled out of the furcation unit 10 during the optical fiber 42 termination process.

However, with reference now to FIG. 3, there can be seen an alternative embodiment of the furcation unit of the above-referenced parent application, in accordance with the present invention, in which the strength members 52 are extended in a first direction between an outer surface of the fiber optic cable 41 (see FIGS. 1 and 2) and an inner surface of the protective tube 20 proximate a first end of the protective tube 20. In one embodiment, the strength members 52 are folded back and further extend in a second direction opposite to the first direction between an outer surface of the protective tube 20 and an inner surface of the heat shrink tube 40. In another embodiment, the strength members 52 extend in the second direction to a prescribed termination point that is located intermediate opposite ends of the protective tube 20. In another embodiment, the strength members 52 extend in the second direction to a prescribed termination point that is located proximate a second end of the protective tube 20 that is opposite the first end of the protective tube 20. In yet another embodiment, the strength members 52 extend in the second direction to a prescribed termination point that is located beyond a second end of the protective tube 20 that is opposite the first end of the protective tube 20. Just as in the embodiment depicted in FIGS. 1 and 2, the strength members 52 are preferably embedded in an adhesive matrix 80, to thereby capture them in the desired position, and the strength members 52 can be fabricated using an arimid fiber material. Captured in this manner, the strength members 52 cannot be pulled out of the loose tube single fiber cables of the furcation unit during the optical fiber termination process. In this connection, each of the loose tube single fiber cables includes an inner tube 51, the strength members 52, and an outer protective jacketing 53. The inner tube 51 of each of the loose tube single fiber cables may be a nylon tube, and is preferably dimensioned so that the optical fibers 71 can easily be passed through a length of the tube and so that the inner tube 51 can be inserted into the rear of common fiber optic connectors and splices. The strength members 52 enable proper termination of the optical fibers 71 into fiber optic connectors and splices that are designed to attach to a single fiber cable strength member. The strength members 52 protrude from the interior end of the loose tube single fiber cables in the manner shown in FIG. 3. The inner tubes 51 also protrude from the interior end of the loose tube single fiber cables. Thus, the optical fibers 71 are never in contact with any adhesive material used in the adhesive matrix 80. In addition, the adhesive matrix 80 seals the end of the furcation unit where the loose tube single fiber optical cables are contained, keeping moisture, dirt, and insects out of the interior of the furcation unit.

In some cases the inner tubes 51 (23) may be extended through the sealant material 15 into the fiber optic cable 41 (as shown in FIG. 1). This approach is advantageous because it allows the optical fiber 42 (71) to pass completely through the furcation unit 10 without coming in contact with either the sealant material 15 or the material used in the adhesive matrix 43 (80).

Although the invention has been described relative to specific embodiments thereof, there are numerous variations and modifications that will be readily apparent to those skilled in the art in the light of the above teachings. It is therefore to be understood that, within the scope of the appended claims, the invention may be practiced other than as specifically described.

What is claimed is:

1. An assembly, including:
   a fiber-containing structure that contains a plurality of optical fibers;

a furcation tube assembly that includes a plurality of loose tube optical fiber cables, each of the loose tube optical fiber cables including:
  a hollow inner tube;
  a support structure that includes strength members, the support structure surrounding the hollow inner tube; and,
  a protective jacket surrounding the support structure;
a heat shrink tube that joins the fiber-containing structure and the furcation tube assembly;
a protective tube surrounded by the heat shrink tube and disposed in surrounding relationship to the furcation tube assembly; and,
wherein the support structure extends in a first direction between an outer surface of the fiber-containing structure and an inner surface of the protective tube proximate a first end of the protective tube.

2. The assembly as set forth in claim 1, wherein the support structure further is folded back and further extends in a second direction opposite to the first direction between an outer surface of the protective tube and an inner surface of the heat shrink tube.

3. The assembly as set forth in claim 2, wherein the support structure extends in the second direction to a prescribed termination point that is located intermediate opposite ends of the protective tube.

4. The assembly as set forth in claim 2, wherein the support structure extends in the second direction to a prescribed termination point that is located proximate a second end of the protective tube that is opposite the first end of the protective tube.

5. The assembly as set forth in claim 2, wherein the support structure extends in the second direction to a prescribed termination point that is located beyond a second end of the protective tube that is opposite the first end of the protective tube.

6. The assembly as set forth in claim 1, wherein the fiber-containing structure comprises a fiber optic cable.

7. The assembly as set forth in claim 1, wherein the plurality of optical fibers include at least end portions that are unprotected.

8. The assembly as set forth in claim 1, wherein the plurality of loose tube optical fiber cables are each coupled to a fiber optic connector.

9. The assembly as set forth in claim 1, wherein the plurality of loose tube optical fiber cables are each coupled to a fiber optic splice.

10. The assembly as set forth in claim 1, wherein the protective tube is made of a rigid material that provides structural support to withstand bending and tensile loads.

11. The assembly as set forth in claim 1, wherein the heat shrink tube comprises an adhesive-coated heat shrink tube.

12. The assembly as set forth in claim 2, wherein the heat shrink tube comprises an adhesive-coated heat shrink tube.

13. The assembly as set forth in claim 1, wherein the heat shrink tube comprises a polyolefin tube.

14. The assembly as set forth in claim 10, wherein the rigid material comprises a plastic material.

15. The assembly as set forth in claim 1, wherein the protective tube comprises a polyetheylene plastic tube.

16. The assembly as set forth in claim 1, wherein the hollow inner tube of each of the plurality of loose tube optical tiber cables comprises a nylon tube.

17. The assembly as set forth in claim 1, wherein the strength members of each of the plurality of loose tube optical fiber cables are comprised of an arimid fiber material.

18. The assembly as set forth in claim 1, further including a sealant material that seals the fiber-containing structure.

19. The assembly as set forth in claim 1, further including a spacer/fiber guide located within the protective tube to direct respective ones of the plurality of optical fibers from the fiber-containing structure to the respective ones of the plurality of loose tube optical fiber cables.

20. A method, including the steps of:
  providing a fiber-containing structure that contains a plurality of optical fibers;
  providing a furcation tube assembly that includes a plurality of loose tube optical fiber cables;
  joining the fiber-containing structure and the furcation tube assembly with a heat shrink tube;
  coupling the plurality of optical fibers to respective ones of the plurality of loose tube optical fiber cables; and
  assembling a protective tube in surrounding relationship to the furcation tube assembly and inside of the heat shrink tube in substantially concentric relationship thereto,
    wherein the step of providing a furcation tube assembly that includes a plurality of loose tube optical fiber cables includes the sub-steps of:
  providing a plurality of hollow inner tubes;
  constructing a support structure in surrounding relationship to the plurality of hollow inner tubes;
  extending the support structure in first direction between an outer surface of the fiber-containing structure and an inner surface of the protective tube proximate a first end of the protective tube; and,
  assembling a protective jacket in surrounding relationship to the support structure.

21. The method as set forth in claim 20, wherein the plurality of optical fibers include at least end portions that are unprotected.

22. The method as set forth in claim 20, further including the step of connectorizing the plurality of loose tube optical fiber cables to a fiber optic connector.

23. The method as set forth in claim 20, further including the step of connectorizing the plurality of loose tube optical fiber cables to a fiber optic splice.

24. The method as set forth in claim 20, wherein the fiber-containing structure comprises a fiber optic cable.

25. The method as set forth in claim 20, wherein the protective tube is made of a rigid material that provides structural support to withstand bending and tensile loads.

26. The method as set forth in claim 20, wherein the heat shrink tube comprises an adhesive-coated heat shrink tube.

27. The method as set forth in claim 20, wherein the sub-step of extending the support structure further comprises folding back the support structure and extending the support structure in a second direction opposite to the first direction between an outer surface of the protective tube and an inner surface of the heat shrink tube.

28. The method as set forth in claim 20, wherein the sub-step of extending the support structure further comprises folding back the support structure and extending the support structure in a second direction opposite to the first direction between an outer surface of the protective tube and an inner surface of the heat shrink tube to a prescribed termination point that is located intermediate opposite ends of the protective tube.

29. The method as set forth in claim 20, wherein the sub-step of extending the support structure further comprises folding back the support structure and extending the support structure in a second direction opposite to the first direction between an outer surface of the protective tube and an inner surface of the heat shrink tube to a prescribed termination point that is located proximate a second end of the protective tube that is opposite the first end of the protective tube.

30. The method as set forth in claim 20, wherein the sub-step of extending the support structure further comprises folding back the support structure and extending the support structure in a second direction opposite to the first direction between an outer surface of the protective tube and an inner surface of the heat shrink tube to a prescribed termination point that is located beyond a second end of the protective tube that is opposite the first end of the protective tube.

* * * * *